United States Patent
Radhakrishnan et al.

(10) Patent No.: US 12,367,290 B2
(45) Date of Patent: Jul. 22, 2025

(54) SYSTEMS AND METHODS FOR SECURITY STATE OPTIMIZATION OF SPDM-ENABLED DEVICES

(71) Applicant: Dell Products, L.P., Round Rock, TX (US)

(72) Inventors: Vineeth Radhakrishnan, Palakkad (IN); Mini Thottunkal Thankappan, Bangalore (IN); Shinose Abdul Rahiman, Bangalore (IN); Rama Rao Bisa, Bangalore (IN); Dharma Bhushan Ramaiah, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 289 days.

(21) Appl. No.: 18/171,924

(22) Filed: Feb. 21, 2023

(65) Prior Publication Data
US 2024/0281538 A1    Aug. 22, 2024

(51) Int. Cl.
G06F 21/57    (2013.01)

(52) U.S. Cl.
CPC .......... *G06F 21/577* (2013.01); *G06F 21/575* (2013.01); *G06F 2221/033* (2013.01)

(58) Field of Classification Search
CPC ................. G06F 21/577; G06F 21/575; G06F 2221/033; G06F 21/57
See application file for complete search history.

(56) References Cited

U.S. PATENT DOCUMENTS

| | | | | |
|---|---|---|---|---|
| 9,215,142 | B1 * | 12/2015 | Herold | H04L 43/0817 |
| 2005/0075135 | A1 * | 4/2005 | Cromer | G06F 21/85 |
| | | | | 455/556.1 |
| 2013/0239167 | A1 * | 9/2013 | Sreenivas | G06F 21/577 |
| | | | | 726/1 |
| 2015/0127795 | A1 * | 5/2015 | Jagana | H04L 63/20 |
| | | | | 709/223 |
| 2016/0277424 | A1 * | 9/2016 | Mawji | G06Q 20/4016 |
| 2017/0126705 | A1 * | 5/2017 | Mirashrafi | H04L 63/102 |
| 2018/0260566 | A1 * | 9/2018 | Chaganti | G06F 9/5077 |
| 2021/0117563 | A1 * | 4/2021 | Moresmau | G06F 21/6218 |
| 2021/0157923 | A1 * | 5/2021 | Mallya | G06F 21/6218 |

FOREIGN PATENT DOCUMENTS

CN    115221087 A    * 10/2022

OTHER PUBLICATIONS

DMTF, Security Protocol and Data Model (SPDM) Specification, https://www.dmtf.org/dsp/DSP0274, Dec. 22, 2019 (Year: 2019).*
Chen et al. Chinese Patent No. CN 115221087 (machine translation) (Year: 2022).*

\* cited by examiner

*Primary Examiner* — Jung W Kim
*Assistant Examiner* — Howard H. Louie
(74) *Attorney, Agent, or Firm* — Fogarty LLP (57) ABSTRACT

According to embodiments of the present disclosure, an Information Handling System (IHS) includes a plurality of Security Protocol and Data Model (SPDM)-enabled devices conforming to a SPDM specification, and instructions stored in a memory and executable by a processor to communicate with the SPDM-enabled devices to derive a trust score for each of the SPDM-enabled devices, and perform one or more optimization actions to optimize an overall security state of the IHS.

17 Claims, 3 Drawing Sheets

SYSTEMS AND METHODS FOR SECURITY STATE OPTIMIZATION OF SPDM-ENABLED DEVICES

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In modern day IHSs, administrative management is often provided via baseboard management controllers (BMCs). The baseboard management controller (BMC) generally includes a specialized microcontroller embedded on the motherboard of the IHS, and provides an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take some corrective actions, such as resetting or power cycling the system to get a hung O/S running again. These abilities save on the total cost of ownership of an IHS, particularly when implemented in large clusters, such as server farms.

SUMMARY

According to embodiments of the present disclosure, an Information Handling System (IHS) includes a plurality of Security Protocol and Data Model (SPDM)-enabled devices conforming to a SPDM specification, and instructions stored in a memory and executable by a processor to communicate with the SPDM-enabled devices to derive a trust score for each of the SPDM-enabled devices, and perform one or more optimization actions to optimize an overall security state of the IHS.

According to another embodiment, a security state optimization method includes the steps of communicating with a plurality of Security Protocol and Data Model (SPDM)-enabled devices to derive a trust score for each of the SPDM-enabled devices, and performing one or more optimization actions to optimize an overall security state of an Information Handling System (IHS).

According to yet another embodiment, a computer program product includes a computer readable storage medium having program instructions stored thereon that, when executed by a Baseboard Management Controller (BMC), cause the BMC to communicate with a plurality of Security Protocol and Data Model (SPDM)-enabled devices to derive a trust score for each of the SPDM-enabled devices, the SPDM-enabled devices conforming to an SPDM specification, and perform one or more optimization actions to optimize an overall security state of an Information Handling System (HIS).

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which supports peer-to-peer messaging (e.g., route by ID), allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

The SPDM specification provides for measuring trust scores for individual IHSs (e.g., servers, personal computers, notebook computers, etc.) as well as clusters (e.g., data centers, computing racks, etc.) comprised of multiple IHSs. In general, a trust score provides a rating based on the SPDM parameters. Although the trust score gives a brief idea of an overall security state of a server or a cluster, when a cluster trust score is generated by an administration console in which the trust score is derived from all the servers in the cluster, the user (e.g., administrator) may not be sure as to whether the derived trust score is the best that can achieved in the cluster. Additionally, the derived overall trust score does not inherently possess the ability to show how to achieve the best possible trust score. This problem is equally applicable to the individual trust score of a single server also.

Another problem exists with devices configured in an IHS that are configured to perform at least one function associated with a bootstrapping process of the IHS. When an IHS (e.g., server) is in a S5 state (e.g., powered-off state), a few of the devices can still support the side-band communication. Traditionally, only a few devices do actually support side-band communication in the S5 state, but of late more devices are adding support for side-band communication while in the S5 state.

A typical attestation workflow of storage devices as well as other devices starts once the server is initially powered on. The BIOS/UEFI process, however, does not wait for the attestation of the devices to be completed by BMC or some other means before launching the Operating System (OS) of the server. This may create a problem in which the host can start communicating with a malicious/untrusted device and create security issues such as the OS booting from a malicious/compromised/untrusted storage/boot device. In the PXE boot case, the server can use a malicious network device on the server to boot from a remote boot image. This problem is not limited to boot devices of the server but any other device which is accessed and used by the BIOS and server OS.

As will be described in detail herein below embodiments of the present disclosure provide systems and methods for security state optimization for SPDM-enabled devices in which meaningful trust scores and recommendations can be derived for effective security state optimization of an IHS or a cluster of IHSs. Additionally, embodiments of the present disclosure are presented for attesting the SPDM-enabled devices of an IHS to ensure that only valid devices may be used in the boot process of the IHS for further security state optimization.

Figure 1:
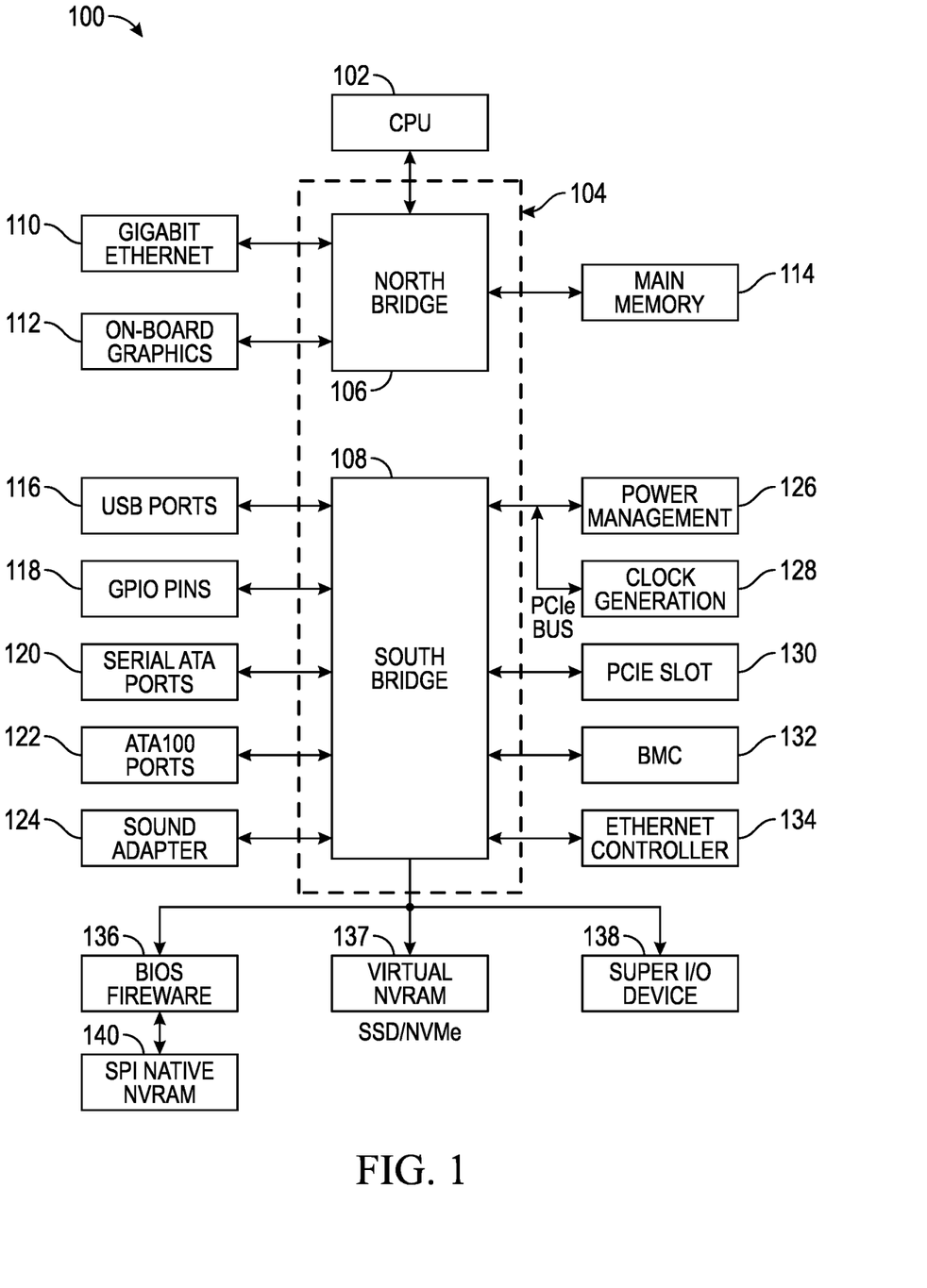
FIG. 1 shows an example of an IHS that may be configured to implement the context information management system and method described herein.

FIG. 1 shows an example of an IHS configured to implement embodiments described herein. It should be appreciated that although certain embodiments described herein may be discussed in the context of a desktop or server computer, other embodiments may be utilized with virtually any type of IHS. Particularly, the IHS includes a baseboard or motherboard 100, which is a printed circuit board (PCB) to which components or devices are mounted to by way of a bus or other electrical communication path. For example, Central Processing Unit (CPU) 102 operates in conjunction with a chipset 104. CPU 102 is a processor that performs arithmetic and logic necessary for the operation of the IHS.

Chipset 104 includes northbridge 106 and southbridge 108. Northbridge 106 provides an interface between CPU 102 and the remainder of the IHS. Northbridge 106 also provides an interface to a random access memory (RAM) used as main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS. Power management circuitry 126 and clock generation circuitry 128 may also be utilized during operation of southbridge 108.

Additionally, southbridge 108 is configured to provide one or more interfaces for connecting mass storage devices to the IHS. For instance, in one embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS. The virtual NVRAM 137 may be utilized by BIOS/firmware 136 to store configuration data for the IHS. In other embodiments, configuration data for the IHS may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS from the factory.

It should be appreciated that, in other embodiments, the IHS may comprise other types of computing devices, including hand-held computers, embedded computer systems, personal digital assistants, and other types of computing devices. It is also contemplated that the IHS may not include all of the components shown in FIG. 1, may include other components that are not explicitly shown in FIG. 1, or may utilize a different architecture.

According to embodiments of the present disclosure, the IHS 100 may support SPDM in which the BMC 132 manages the operation of one or more managed devices configured in the IHS 100. Managed devices may include any SPDM-enabled device, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 2:
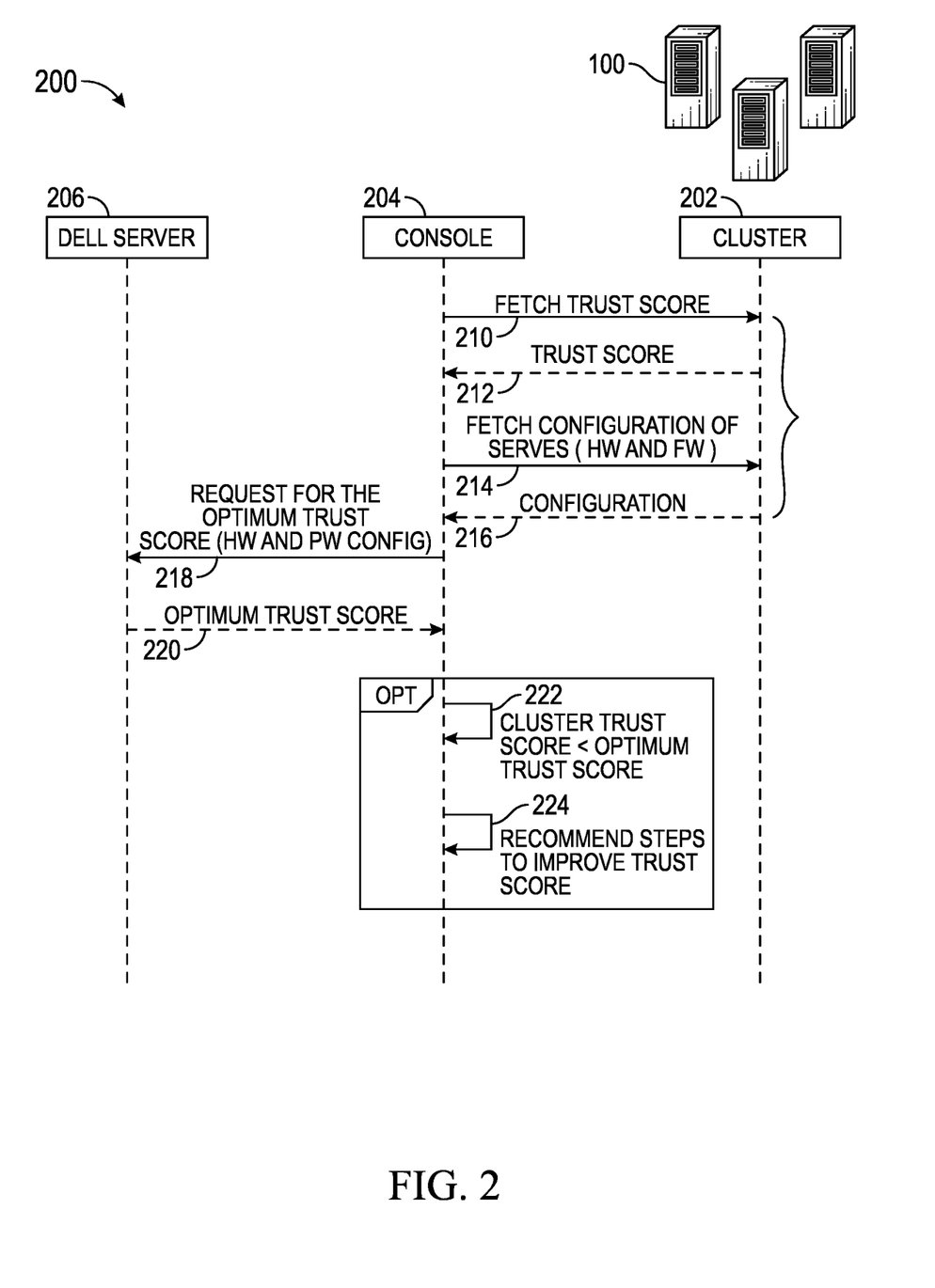
FIG. 2 illustrates an example method for security state optimization of an IHS configured with one or more SPDM-enabled devices according to one embodiment of the present disclosure.

FIG. 2 illustrates an example method 200 for security state optimization of an IHS 100 configured with one or more SPDM-enabled devices according to one embodiment of the present disclosure. The method 200 uses a cluster 202 comprising multiple IHSs 100 that are administered by a console 204, which in turn, communicates with an online trust score optimization service 206. In general, the method 200 may provide a solution that recommends if an opportunity exists to improve trust score of the IHSs 100 in the cluster 202, and provides specific recommendations (e.g., actions) that can be performed to improve the score.

The method 200 may be used to derive a benchmark trust score representing comprising a metric value attributed to an optimal configuration of the SPDM-enabled devices in each of the IHSs 100 of the cluster 202. Additionally, the method 200 may generate recommendations for how to achieve the optimal benchmark trust score by a user of the console 204. Although the present example method 200 is described herein as being applied to a cluster 202 comprising multiple IHSs 100, it should be appreciated that the method 200 may be used to derive benchmark trust scores and recommendations for a single IHS 100 as well.

Initially at step 210, the console 204 issues a request to collect SPDM-based trust scores of individual IHSs 100 of the cluster 202. Thereafter at step 212, the console 204 receives the trust scores from the cluster 202, and derives a cluster trust score. The cluster trust score generally refers to any cumulative value attributed to the overall trust score of the cluster 202, and may be obtained using any suitable algorithm and/or process. For example, the console 204 may derive the cluster trust score using an algorithm that generates an average value of all of the constituent trust score values of the individual SPDM-enabled devices configured in the IHSs 100. The cluster trust score may also be derived or weighted based upon certain factors, such as the operational environment in which the cluster 202 is being used, the age of the SPDM-enabled devices relative to their expected serviceable life, the firmware and/or software versions of the SPDM-enabled devices, and the like.

At step 214, the console 204 issues a request for configuration information associated with each of the IHSs 100 in the cluster 202. The configuration information may include, for example, a hardware and/or firmware version of each of the SPDM-enabled devices as well as a hardware and/or firmware version of a BMC 132 configured in each of the IHSs 100 of the cluster 202. Thereafter at step 216, the console 204 receives the configuration from each of the IHSs 100.

At step 218, the console 204 issues a request to the online service 206 to generate a benchmark trust score for the cluster 202 in which the request includes the configuration information obtained previously at step 216. The online service 206 responds by identifying the best possible trust score based on the current hardware and firmware configuration, and generating recommendations to improve the trust score. The online service 206 may identify gaps with respect to the optimal benchmark configuration in which one gap may include a particular firmware version of a SPDM-enabled device that is optimally suited for use with a particular firmware version of the BMC 132 that manages the operation of that SPDM-enabled device. For example, if one of the SPDM-enabled devices in the IHS 100 has a newer firmware with support for a new SPDM feature that enhances the trust score, this shall be identified as a gap. From the gaps, the online service 206 may generate specific recommended actions (e.g., firmware upgrade, hardware enhancement, etc.) that can be taken by the user to improve the trust score of the cluster 202 towards the optimal benchmark trust score.

In one embodiment, the online service 206 may be administered by any entity that has an interest, such as a vested interest in the security trust level of the IHSs 100 of the cluster 202. For example, the online service 206 may be a vendor of the IHSs 100 who has an interest in the health and performance of the IHSs 100 over their serviceable life, and who provides support for the IHSs 100 via firmware updates for the SPDM-enabled devices and the IHSs 100 in which the SPDM-enabled devices are configured at ongoing intervals. The vendor administering the online service 206 may be ideally suited for maintaining information associated with the gaps that may cause reduced trust scores because, among other things, the vendor may become readily aware of problems as they are discovered in the field and may react by uploading information associated with the gaps so that those problems may be quickly remedied in other IHSs 100 or clusters 202 shortly after the gaps are discovered.

At step 220, the console 204 receives the benchmark trust score and related recommendations from the online service 206. Thereafter at step 222, the console 204 presents the benchmark trust score for consumption by the user, and at step 224, presents the recommendations for consumption by the user. At this point, the user may implement one or more of the presented recommendations to improve the overall trust score of the cluster 202.

The aforedescribed method may be repeatedly performed for continued monitoring and optimization of the overall trust scores associated with the cluster 202. For example, the method 200 described above may be performed at ongoing intervals (e.g., daily, weekly, monthly, etc.) for ongoing optimization of the overall trust score of the cluster 202. For another example, the method 200 described above may be performed for a first time to incrementally increase the overall trust score of the cluster 202 by implementing a subset of the recommendations, and performed at a second time to further incrementally increase the overall trust score by implementing a second subset of recommendations. Nevertheless, when use of the method 200 is no longer needed or desired, the method 200 ends.

Figure 3:
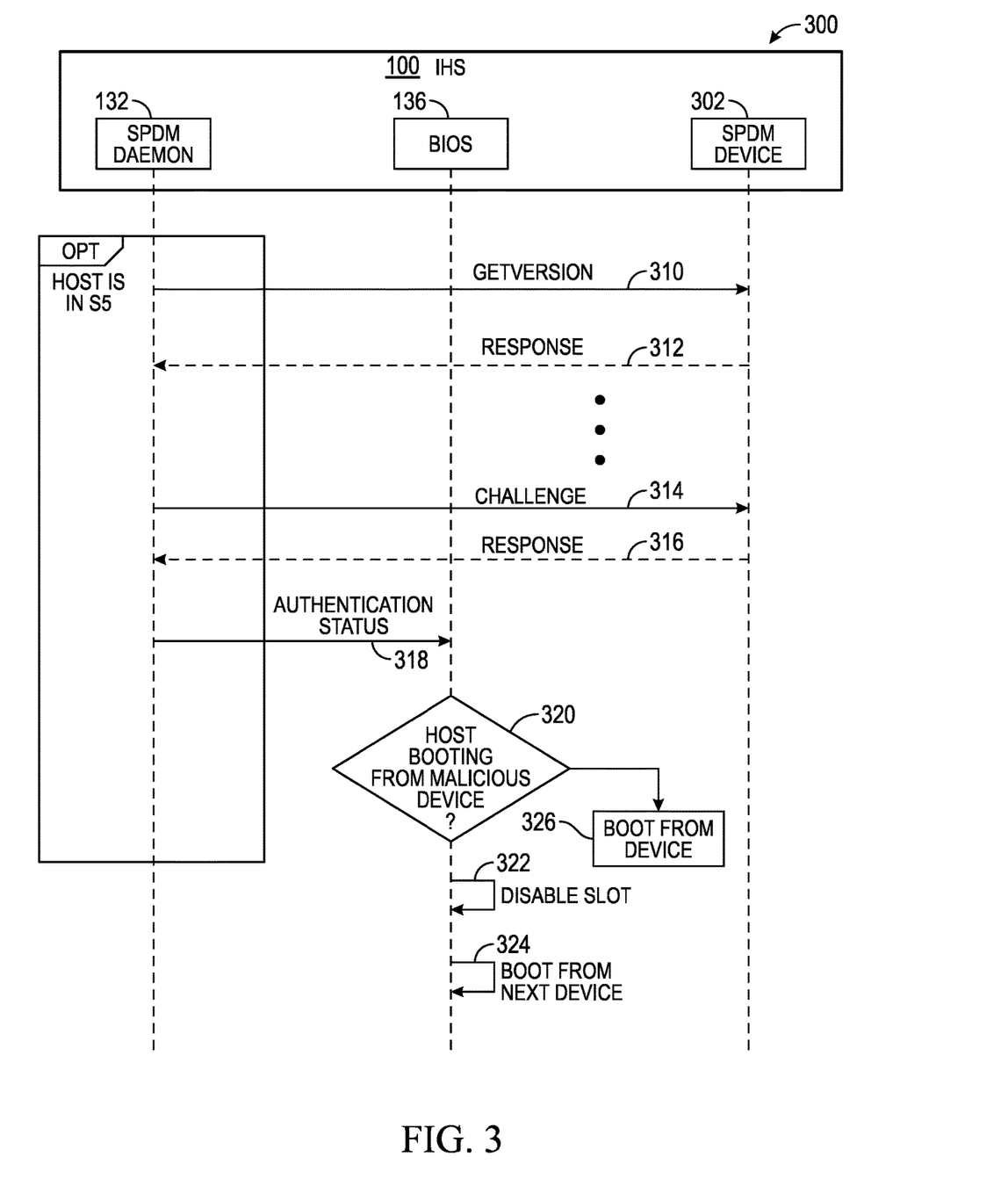
FIG. 3 illustrates another example method that may be implemented for security state optimization of an IHS according to one embodiment of the present disclosure.

FIG. 3 illustrates another example method 300 that may be implemented for security state optimization of an IHS 100 according to one embodiment of the present disclosure. The method 300 may provide for security state optimization by ensuring only valid, authenticated devices are allowed to perform any part of a bootstrapping process of the IHS 100. That is, if any SPDM-enabled device is configured to perform at least one function associated with a bootstrapping process of the IHS, the method 300 ensures that the SPDM-enabled device is authenticated to do so. The method 300 uses a BMC 132, a bios 136, and at least one SPDM-enabled device 302 configured in an IHS 100. Although only one SPDM-enabled device 302 is shown and described herein, it should be appreciated that the method 300 may be performed with any and/or all that could potentially be involved with the boot process of the IHS 100. Examples of such devices may include storage units that store the boot code, Network Interface Cards (NICs) that may be capable of a PXE boot process, bootable USB storage devices, and the like.

The method 300 may be performed at any suitable time. In one embodiment, the method 300 may be performed when the IHS 100 is booted. In another embodiment, the method 300 may be performed when the SPDM-enabled device 302 is hot-plugged into the IHS 100. In yet another embodiment, the method 300 may be performed when the IHS 100 is in a S5 state (e.g., powered-off state), such as immediately after the boot process is started, and up to the time that power is applied to a motherboard associated with the IHS 100.

Initially at step 310, the BMC 132 issues a request to obtain version information from the SPDM-enabled device 302, and at step 312, it receives the requested version information. The version information may be useful for determining whether the SPDM-enabled device 302 is configured to have any involvement with the booting of the IHS 100. Thereafter at step 314, the BMC 132 issues a challenge request to the SPDM-enabled device 302, and at step 316, it receives a response to authenticate the SPDM-enabled device 302 with the BMC 132. Steps 310-316 may be performed for each SPDM-enabled device 302 configured in the IHS 100. That is, the BMC 132 attests some, most, or all the SPDM-enabled devices 302 that are also capable of operation in the S5 state, such as when the IHS 100 is in a S5 state. With the Root-of-Trust (ROT) feature, sufficient time may exist for the BMC 132 to verify the integrity of the SPDM-enabled devices 302 before the IHS 100 is powered on.

The BMC 132 then sends the authentication status of all the SPDM-enabled devices 302 to the bios 136 at step 318. In one embodiment, the BMC 132 sends the authentication status information to the bios 136 using a Keyboard Controller Style (KCS) channel.

At step 320, using the received authentication status, the bios 136 determines whether the IHS 100 is to be booted using a malicious device using the authentication status information. For example, the bios 136 may examine its internal boot order configuration to determine whether the device that is currently scheduled to boot the IHS 100 is one of the SPDM-enabled devices 302, and if so, has that SPDM-enabled device 302 been successfully authenticated by the BMC 132.

If the currently scheduled boot device has been successfully authenticated, processing continues at step 326 in which the bios 136 uses that SPDM-enabled device 302 to boot the IHS 100. If, however, the SPDM-enabled device 302 has failed the authentication, processing continues at step 322 in which the bios 136 disables the SPDM-enabled device 302 from being used with the IHS 100. For example, the bios 136 may disable the SPDM-enabled device 302 by disabling the slot or port address that the illicit SPDM-enabled device 302 uses to interface with the IHS 100. Additionally at step 324, the bios 136 selects the next device in the boot order in order to boot the IHS 100.

Thus as can be seen, SPDM-enabled devices 302 that fail authentication with the BMC 132 may be restricted from being used to boot the IHS 100, thus reducing or eliminating any potential security holes associated with a device that can breach security by booting the IHS 100 from a foreign source. Nevertheless, when use of the method 300 is no longer needed or desired, the method 300 ends.

Although FIGS. 2 and 3 describe example methods 200 and 300 that may be implemented for security state optimization of an IHS 100, the features of the methods 200 and 300 may be embodied in other specific forms without deviating from the spirit and scope of the present disclosure. For example, either of the methods 200 and 300 may perform additional, fewer, or different operations than those described in the present examples. For another example, either of the methods 200 and 300 may be performed in a sequence of steps different from that described above. As yet another example, certain steps of the methods 200 and 300 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a plurality of Security Protocol and Data Model (SPDM)-enabled devices conforming to a SPDM specification;
a processor; and
a memory coupled to the processor, the memory having program instructions stored thereon that, upon execution, cause the IHS to:
communicate out-of-band with each SPDM-enabled device of the plurality of SPDM-enabled devices before launching an Operating System (OS) to boot the IHS from at least one SPDM-enabled device of the plurality of SPDM-enabled devices, to derive a trust score for each of the plurality of SPDM-enabled devices, based at least in part on performing an attestation process using a Root-of-Trust (RoT) accessible to the IHS, the attestation process comprising issuing an authentication challenge to and receiving an authentication response from each of the SPDM-enabled devices;
determine, before booting the IHS and based at least in part on the authentication response and the RoT, whether any SPDM-enabled device of the plurality of SPDM-enabled devices failed the authentication challenge;
determine, before booting the IHS and based at least in part on a boot order configuration in a Basic Input/Output System (BIOS) configured in the IHS, whether the IHS is scheduled to boot from any device of the plurality of SPDM-enabled devices that failed the authentication challenge;
in response to a determination that the IHS is scheduled to boot from any device of the plurality of SPDM-enabled devices that failed the authentication challenge, select another SPDM-enabled device of the plurality of SPDM-enabled devices that succeeded the authentication challenge, and permit the IHS to boot from the selected SPDM-enabled device; and
perform one or more optimization actions to optimize an overall security state of the IHS.

2. The IHS of claim 1, wherein the program instructions, upon execution, further cause the IHS to perform the one or more optimization actions by:
deriving an overall trust score for the plurality of SPDM-enabled devices that are configured in a server;
obtaining configuration information associated with each of the SPDM-enabled devices;
sending the configuration information to an online optimization service, wherein the online service is configured to identify one or more recommendations for changing a configuration of at least one of the SPDM-enabled devices to optimize the overall trust score of the server;
receiving the one or more recommendations from the online optimization service; and
presenting the one or more recommendations to a user of the IHS.

3. The IHS of claim 2, wherein the plurality of SPDM-enabled devices are configured in a plurality of servers comprising a cluster, the overall trust score comprising a metric value associated with a security state level of the cluster.

4. The IHS of claim 3, wherein the program instructions, upon execution, further cause the IHS to:
generate a benchmark trust score comprising a metric value attributed to an optimal configuration of the SPDM-enabled devices in the cluster; and
present the generated benchmark trust score and the overall trust score for consumption by the user.

5. The IHS of claim 2, wherein the overall trust score is based at least in part, on a firmware version of one SPDM-enabled device relative to a firmware version of a second SPDM-enabled device, or on a software version of one respective SPDM-enabled device relative to a software version of a second respective SPDM-enabled device.

6. The IHS of claim 1, wherein the program instructions, upon execution, further cause the IHS to perform the attestation process when the IHS is in a S5 state.

7. The IHS of claim 1, further comprising:
a Baseboard Management Controller (BMC) configured to perform the attestation process; and
a Basic Input/Output System (BIOS) configured to inhibit the IHS from being booted with the one SPDM-enabled device that failed the attestation process.

8. The IHS of claim 7, wherein the BMC communicates with the BIOS using a Keyboard Controller Style (KCS) channel.

9. The IHS of claim 1, wherein at least one SPDM-enabled device that failed the attestation process is configured to perform at least one function associated with a bootstrapping process of the IHS.

10. A security state optimization method comprising:
communicating out-of-band with a plurality of Security Protocol and Data Model (SPDM)-enabled devices before launching an Operating System (OS) to boot an Information Handling System (IHS) from at least one SPDM-enabled device of the plurality of SPDM-enabled devices, to derive a trust score for each of the plurality of SPDM-enabled devices, based at least in part on performing an attestation process using a Root-of-Trust (ROT) accessible to the IHS, the attestation process comprising issuing an authentication challenge to and receiving an authentication response from each of the SPDM-enabled devices;
determining, before launching the OS and based at least in part on the authentication response and the ROT, whether any SPDM-enabled device of the plurality of SPDM-enabled devices failed the authentication challenge;
determining, before launching the OS and based at least in part on a boot order configuration in a Basic Input/Output System (BIOS) configured in the IHS, whether the IHS is scheduled to boot from any device of the plurality of SPDM-enabled devices that failed the authentication challenge; and
in response to a determination that the IHS is scheduled to boot from any device of the plurality of SPDM-enabled devices that failed the authentication challenge, select another SPDM-enabled device of the plurality of SPDM-enabled devices that succeeded the authentication challenge, and permit the IHS to boot based on launching the OS from the selected SPDM-enabled device; and
performing one or more optimization actions to optimize an overall security state of the IHS.

11. The security state optimization method of claim 10, further comprising:
deriving an overall trust score for the plurality of SPDM-enabled devices that are configured in a server;
obtaining configuration information associated with each of the SPDM-enabled devices;
sending the configuration information to an online optimization service, wherein the online optimization service is configured to identify one or more recommendations for changing a configuration of at least one of the SPDM-enabled devices to optimize the overall trust score of the server;
receiving the one or more recommendations from the online optimization service; and
presenting the one or more recommendations to a user of the IHS.

12. The security state optimization method of claim 11, further comprising:
generating a benchmark trust score comprising a metric value attributed to an optimal configuration of the plurality of SPDM-enabled devices in a cluster comprising a plurality of servers; and
presenting the generated benchmark trust score and the overall trust score for consumption by the user.

13. A computer program product comprising a non-transitory computer readable storage medium having program instructions stored thereon that, upon execution by a Baseboard Management Controller (BMC), cause the BMC to:
communicate out-of-band with each Security Protocol and Data Model (SPDM)-enabled device of a plurality of SPDM-enabled devices configured in an Information Handling System (IHS) before launching an Operating System (OS) to boot the IHS from at least one SPDM-enabled device of the plurality of SPDM-enabled devices, to derive a trust score for each SPDM-enabled device of the plurality of SPDM-enabled devices, based at least in part on performing an attestation process using a Root-of-Trust (ROT) accessible to the IHS, the attestation process comprising issuing an authentication challenge to and receiving an authentication response from each of the SPDM-enabled devices, wherein the plurality of SPDM-enabled devices conform to an SPDM specification;

determine, before booting the IHS and based at least in part on the authentication response and the ROT, whether any SPDM-enabled device of the plurality of SPDM-enabled devices failed the authentication challenge;

determine, before booting the IHS and based at least in part on a boot order configuration in a Basic Input/Output System (BIOS) configured in the IHS, whether the IHS is scheduled to boot from any device of the plurality of SPDM-enabled devices that failed the authentication challenge;

in response to a determination that the IHS is scheduled to boot from any device of the plurality of SPDM-enabled devices that failed the authentication challenge, select another SPDM-enabled device of the plurality of SPDM-enabled devices that succeeded the authentication challenge, and permit the IHS to boot from the selected SPDM-enabled device; and perform one or more optimization actions to optimize an overall security state of the IHS.

14. The computer program product of claim 13, wherein the program instructions, upon execution, further cause the BMC to perform the one or more optimization actions by:

deriving an overall trust score for the plurality of SPDM-enabled devices that are configured in a server;

obtaining configuration information associated with each of the SPDM-enabled devices;

sending the configuration information to an online optimization service, wherein the online optimization service is configured to identify one or more recommendations for changing a configuration of at least one of the SPDM-enabled devices to optimize the overall trust score of the server;

receiving the one or more recommendations from the online optimization service; and presenting the one or more recommendations to a user of the IHS.

15. The computer program product of claim 14, wherein the SPDM-enabled devices are configured in a plurality of servers comprising a cluster, the overall trust score comprising a metric value associated with a security state level of the cluster.

16. The computer program product of claim 15, wherein the program instructions, upon execution, further cause the IHS to:

generate a benchmark trust score comprising a metric value attributed to an optimal configuration of the SPDM-enabled devices in the cluster; and present the generated benchmark trust score and the overall trust score for consumption by the user.

17. The computer program product of claim 13, wherein at least one SPDM-enabled device that failed the attestation process is configured to perform at least one function associated with a bootstrapping process of the IHS.

* * * * *